US009181911B2

(12) United States Patent
Fujisawa et al.

(10) Patent No.: US 9,181,911 B2
(45) Date of Patent: Nov. 10, 2015

(54) GAS ENGINE SYSTEM WITH DETECTION FUNCTION OF ABNORMALITY OCCURRENCE OF GAS PRESSURE DETECTION MECHANISM

(75) Inventors: Toshinobu Fujisawa, Osaka (JP); Kenji Ogata, Osaka (JP); Shohei Amakawa, Osaka (JP); Masato Watanabe, Osaka (JP); Hiroyuki Okada, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 295 days.

(21) Appl. No.: 13/979,543

(22) PCT Filed: Jan. 13, 2012

(86) PCT No.: PCT/JP2012/050607
§ 371 (c)(1),
(2), (4) Date: Aug. 27, 2013

(87) PCT Pub. No.: WO2012/096379
PCT Pub. Date: Jul. 19, 2012

(65) Prior Publication Data
US 2013/0327295 A1    Dec. 12, 2013

(30) Foreign Application Priority Data

Jan. 14, 2011   (JP) .................................. 2011-006007

(51) Int. Cl.
*F02M 69/00* (2006.01)
*F02D 41/00* (2006.01)
(Continued)

(52) U.S. Cl.
CPC .............. *F02M 69/00* (2013.01); *F02D 19/023* (2013.01); *F02D 19/025* (2013.01);
(Continued)

(58) Field of Classification Search
CPC ........... F02M 1/16; F02M 1/18; F02M 21/00; F02M 69/00

USPC ...... 123/27 GE, 196 S, 198 D, 520, 525–527, 123/529, 575; 701/100–102, 114; 73/114.33, 114.37, 114.43
See application file for complete search history.

(56) References Cited

U.S. PATENT DOCUMENTS

| 2,908,258 | A  | * | 10/1959 | Schowalter et al. ...... 123/27 GE |
| 6,721,649 | B2 | * | 4/2004  | Knott et al. .................... 701/114 |
| 6,923,201 | B2 |   | 8/2005  | Fujita |
| 7,676,316 | B2 | * | 3/2010  | Lunati et al. .................. 701/103 |
| 7,739,028 | B2 | * | 6/2010  | Groer et al. .................... 701/115 |

(Continued)

FOREIGN PATENT DOCUMENTS

| JP | 7-30931 Y2   | 7/1995  |
| JP | 11-324807 A  | 11/1999 |
| JP | 2001-317695 A | 11/2001 |
| JP | 2002-70632 A  | 3/2002  |
| JP | 2006-329135 A | 12/2006 |

OTHER PUBLICATIONS

International Search Report dated Apr. 17, 2012 including partial English-language translation (Four (4) pages).

*Primary Examiner* — John Kwon
*Assistant Examiner* — Johnny H Hoang
(74) *Attorney, Agent, or Firm* — Crowell & Moring LLP

(57) ABSTRACT

A gas engine system has a control unit including: a first determination section for determining, as a first determination, whether the gas pressure is a low pressure less than a predetermined pressure, while the control device recognizes the gas valve is closed; a second determination section for determining, as a second determination, whether the gas pressure is a high pressure equal to or more than the predetermined pressure, while the control device recognizes that the gas valve is open, if the first determination determines the gas pressure is the low pressure; a start-up section for performing the first and second determinations before start of engine operation when receiving a start-up command; and an operation start section for opening the valve and starting the engine, if the first determination determines the gas pressure is the low pressure, and if the second determination determines the pressure is the high pressure.

5 Claims, 7 Drawing Sheets

(51) Int. Cl.
*F02D 41/22* (2006.01)
*F02D 19/02* (2006.01)
*F02D 41/06* (2006.01)
*F02N 11/10* (2006.01)

(52) U.S. Cl.
CPC ......... *F02D 19/027* (2013.01); *F02D 41/0027* (2013.01); *F02D 41/062* (2013.01); *F02D 41/222* (2013.01); *F02D 2041/223* (2013.01); *F02D 2200/0602* (2013.01); *F02N 11/101* (2013.01); *Y02T 10/32* (2013.01); *Y02T 10/40* (2013.01)

(56) References Cited

U.S. PATENT DOCUMENTS

| | | | |
|---|---|---|---|
| 2001/0010214 A1* | 8/2001 | Maegawa et al. | 123/339.23 |
| 2004/0244778 A1* | 12/2004 | Tanaka et al. | 123/479 |
| 2005/0284451 A1* | 12/2005 | Uhde et al. | 123/525 |
| 2009/0007877 A1* | 1/2009 | Raiford | 123/192.1 |
| 2012/0310509 A1* | 12/2012 | Pardo et al. | 701/104 |
| 2013/0000752 A1* | 1/2013 | Saito et al. | 137/455 |
| 2013/0197777 A1* | 8/2013 | Sloan et al. | 701/102 |
| 2014/0048046 A1* | 2/2014 | Saeki | 123/478 |
| 2014/0182561 A1* | 7/2014 | Ibizugbe, Jr. | 123/511 |

\* cited by examiner

GAS ENGINE SYSTEM WITH DETECTION FUNCTION OF ABNORMALITY OCCURRENCE OF GAS PRESSURE DETECTION MECHANISM

TECHNICAL FIELD

The present invention relates to a gas engine system having a gas engine, a gas passage for supplying a fuel gas to the gas engine, a gas valve for opening and closing the gas passage, a control device for controlling the gas valve, a pressure sensor for outputting pressure information corresponding to a gas pressure in the gas passage on a downstream side of the gas valve, and a transfer mechanism for transmitting the pressure information from the pressure sensor to the control device.

BACKGROUND ART

Conventionally, in order to detect a pressure in a gas pipe for supplying a gas to a gas engine, a pressure sensor is provided on the gas pipe. An example of a gas pressure detection device is shown in FIG. 2 of Patent Document 1. On the gas pipe, a pressure sensor, gas valves for opening and closing the gas pipe, and a gas engine are disposed in order. The gas valves consist of two electromagnetic valves and a pressure adjustment valve. When the gas valve opens the gas pipe, the pressure in the gas pipe changes. The pressure change in the gas pipe is detected by the pressure sensor.

The detection device of Patent Document 1 always monitors an output signal of a pressure switch, whereby when the gas pressure in the gas pipe is reduced, the detection device shuts down the gas engine. The reason for this is as follows: If operation of the gas engine is continued in a state in which the gas pressure is reduced, the pressure in the gas pipe becomes a negative pressure, so that there is fear of the occurrence of failure in which air is mixed in the gas pipe from an opening formed in the gas pipe, for example, from a gas supply port to other gas equipment. In the detection device of Patent Document 1, the reduction in the gas pressure is detected, whereby the occurrence of such failure can be prevented.

Incidentally, for power saving, a pressure switch having a b-contact is widely used as the pressure sensor in Japan. When the gas pressure is higher than a set pressure, the b-contact is open, which becomes a non-conductive state. On the other hand, when the gas pressure is lower than the set pressure, the b-contact is closed, which becomes a conductive state. That is, when the gas pressure is lower than the set pressure, a detection signal is outputted from the pressure switch, and when the gas pressure is higher than the set pressure, the signal is not outputted from the pressure switch. Namely, since the pressure switch becomes the conductive state only at the occurrence of an abnormality in which the gas pressure in the gas pipe is reduced more than the set pressure, power consumption of the pressure switch is kept low. In particular, if a battery is used as a power supply for the pressure switch instead of a system power supply, the battery life can be extended.

PRIOR ART DOCUMENT

Patent Document

Patent Document 1: Japanese examined utility model publication No. H07-30931

SUMMARY OF INVENTION

Technical Problem

As described above, in the pressures switch having the b-contact, the detection signal is outputted if the gas pressure is the low pressure, and the signal is not outputted if the gas pressure is the high pressure. However, when the pressure switch is broken, or also when a signal line extending from the pressure switch to the control device is disconnected, the control device cannot detect the signal of the pressure switch irrespective of the magnitude of the gas pressure.

Accordingly, it is an object of the present invention to provide a gas engine system that determine whether or not an abnormality has occurred such as failure of the pressure switch and disconnection of the signal line and so on, and can accurately monitor the gas pressure.

Solution to Problem

A gas engine system of the present invention comprises: a gas engine; a gas passage for supplying a fuel gas to the gas engine; a gas valve for opening and closing the gas passage; a control device for recognizing opening and closing of the gas valve, and controlling the gas valve; a pressure sensor for outputting pressure information corresponding to a gas pressure in the gas passage on a downstream side of the gas valve; and a transfer mechanism for transmitting the pressure information from the pressure sensor to the control device, wherein the control device comprises: a first determination section for determining, as a first determination, whether or not the gas pressure is a low pressure of less than a predetermined pressure on the basis of the pressure information, while the control device recognizes that the gas valve is closed; an opening section for opening the gas valve if it is determined that the gas pressure is the low pressure in the first determination; a second determination section for determining, as a second determination, whether or not the gas pressure is a high pressure of equal to or more than the predetermined pressure on the basis of the pressure information, while the control device recognizes that the gas valve is open, if it is determined that the gas pressure is the low pressure in the first determination; a closing section for closing the gas valve after the second determination is performed; and an abnormality determination section for determining that an abnormality has occurred, if it is determined that the gas pressure is the high pressure in the first determination, or if it is determined that the gas pressure is the low pressure in the second determination.

According to the gas engine system of the present invention, the control device can determine whether or not the pressure information actually transmitted to the control device from the pressure sensor corresponds to the gas pressure estimated by opening and closing of the gas valve, and can determine whether or not the abnormality has occurred on the basis of the determination result.

Preferably, the control device controls the gas engine, and further comprises: a start-up section for performing the first determination and the second determination before start of operation of the gas engine when receiving the start-up command; and an operation start section for opening the gas valve and starting the operation of the gas engine, if it is determined that the gas pressure is the low pressure in the first determination, and if it is determined that the gas pressure is the high pressure in the second determination.

According to the gas engine system of the present invention, the control device can prevent the operation of the gas engine from starting at the occurrence of the abnormality in the gas pressure detection mechanism such as the transfer mechanism for the pressure information or the pressure switch.

Preferably, the pressure sensor is a pressure switch having a b-contact, which becomes a conductive state when the gas pressure is the low pressure, and which becomes a non-conductive state when the gas pressure is the high pressure.

According to the gas engine system of the present embodiment, if it is determined that the pressure switch is in the non-conductive state before opening the gas valve, the control device can detect failure of the pressure switch or disconnection of an output line of the pressure switch and so on. If it is determined that the pressure switch is not switched to the non-conductive state even if the gas valve is opened, the control device can detect failure of the pressure switch or a short circuit between the output line of the pressure switch and a power supply and so on.

Preferably, the pressure sensor is a pressure switch having a a-contact, which becomes a conductive state when the gas pressure is the high pressure, and which becomes a non-conductive state when the gas pressure is the low pressure.

According to the gas engine system of the present embodiment, if it is determined that the pressure switch is in the conductive state before opening the gas valve, the control device can detect failure of the pressure switch or a short circuit between the output line of the pressure switch and the power supply and so on. If it is determined that the pressure switch is not switched to the conductive state even if the gas valve is opened, the control device can detect failure of the pressure switch or disconnection of the output line of the pressure switch and so on.

Preferably, the transfer mechanism for the pressure information further comprises a logic circuit for generating a combined signal of a positive signal that reflects a conductive or non-conductive state of the pressure switch and a reverse signal that inverts the conductive or non-conductive state of the pressure switch.

According to the gas engine system of the present invention, the control device can obtain an output signal even if the pressure switch having the b-contact is in the non-conductive state.

DESCRIPTION OF EMBODIMENTS

Figure 1:
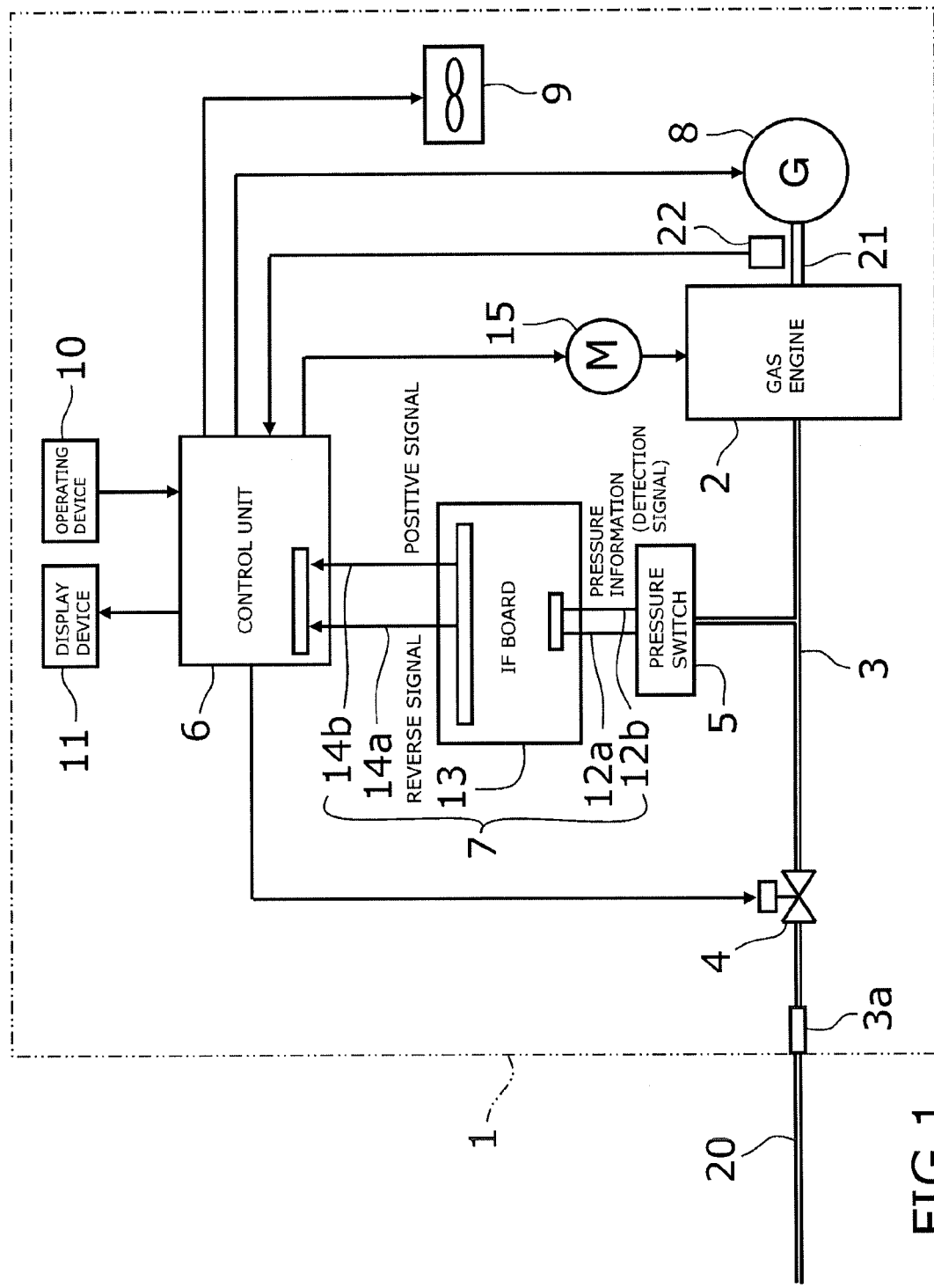
FIG. 1 is an overall view showing a gas engine system.

FIG. 1 is an overall view showing a gas engine system 1. The system 1 includes a gas engine 2, a gas pipe (gas passage) 3, a gas valve 4, a gas pressure switch (pressure sensor) 5, a control unit (control device) 6, a transfer mechanism 7, a generator 8, a fan 9, an operating device (input device) 10, a display device (alarm) 11, and a starter motor 15.

The gas pipe 3 is connected to a gas pipe 20 outside the gas engine system 1, and supplies the gas engine 2 with a fuel gas. Along the gas pipe 3, a connecting port 3a that forms a starting end of the gas pipe 3, the gas valve 4, the gas pressure switch 5, and the gas engine 2 are placed in order. The gas valve 4 is an electromagnetic control valve, and opens and closes the gas pipe 3. The gas pressure switch 5 outputs pressure information corresponding to a gas pressure in the gas pipe 3 on a downstream side of the gas valve 4. The control unit 6 controls the gas engine 2, the gas valve 4, the generator 8, the fan 9, the display device 11, and the starter motor 15. The transmission system 7 transmits the pressure information outputted from the gas pressure switch to the control unit 6. The generator 8 generates electric power from rotative power transmitted to an output shaft 21 of the gas engine 2. The fan 9 ventilates the inside of the system 1. The gas engine system 1 is surrounded by a casing, for example. The operating device inputs various commands on the basis of an operator's input operation to the control unit 6. The display device displays image information outputted from the control unit 6. The starter motor 15 starts the gas engine 2.

The gas pressure switch 5 has a b-contact. If the gas pressure is lower than a set pressure of the pressure switch, the b-contact is closed, which becomes a conductive state, so that a current flows through an IF board 13 connected to the b-contact. On the other hand, when the gas pressure is higher than the set pressure, the b-contact is open, which is in a non-conductive state. The set pressure serving as a threshold value can be set to an optional predetermined pressure.

That is, if the gas pressure is lower than the set pressure, a detection signal is outputted to the transfer mechanism 7 from the gas pressure switch 5, and when the gas pressure is higher than the set pressure, the signal is not outputted from the gas pressure switch 5. The pressure information outputted from the gas pressure switch 5 is composed of a detection signal generated by conduction and a non-detection signal that means non-conduction. Either one of the detection signal and the non-detection signal is taken as the pressure information in the respective time points.

The transfer mechanism 7 includes SW output lines 12a and 12b, the IF board (interface board (logic circuit)) 13, and a positive signal line 14a and a reverse signal line 14b.

The SW output lines 12a and 12b each connect the gas pressure switch 5 and the IF board 13. A circuit is formed between the gas pressure switch 5 and the IF board by the SW output lines 12a, 12b. The pressure information is transmitted from the pressure gas switch 5 to the IF board 13 via the SW output lines 12a, 12b.

The IF board 13 generates a combined signal of a positive signal and a reverse signal on the basis of the pressure information outputted from the gas pressure switch 5, and inputs, as the pressure information, the combined signal to the control unit 6. The positive signal is a detection signal or a non-detection signal reflecting the output of the gas pressure switch 5. On the other hand, the reverse signal is a detection signal or a non-detection signal obtained by inverting the output of the gas pressure switch 5. That is, if the gas pressure switch 5 is in the conductive state, the combined signal becomes as follows: the positive signal serves as an ON signal, and the reverse signal serves as an OFF signal. If it is in the non-conductive state, the combined signal becomes as follows: the positive signal serves as the OFF signal, and the reverse signal serves as the ON signal. Generating the reverse signal in this manner makes it possible to transmit a signal including the ON signal even in the non-conductive state.

The positive signal line 14a and the reverse signal line 14b each connect the IF board 13 and the control unit 6. The positive signal is transmitted to the control unit 6 via the positive signal line 14a, and the reverse signal is transmitted to the control unit 6 via the reverse signal line 14b. In the present embodiment, although the IF board 13 is constructed separately from the control unit 6, a function of the IF board 13 may be included in the control unit 6.

Next, start-up control of the system 1 will be described. The start-up control is a control for starting up the system 1. The start-up control includes an abnormality detection control. The abnormality detection control is a control for inspecting whether or not the pressure information actually transmitted to the control unit 6 corresponds to a gas pressure estimated by opening and closing of the gas valve 4. Hereinafter, the abnormality indicates that the pressure information actually transmitted to the control unit 6 does not correspond to the gas pressure estimated by opening and closing of the gas valve 4. Therefore, a cause of the abnormality not only includes failure of the pressure sensor 5 and the transfer mechanism 7, but also includes failure of the gas valve 4 and a reduction in gas pressure when the gas is supplied from the outside.

Figure 2:
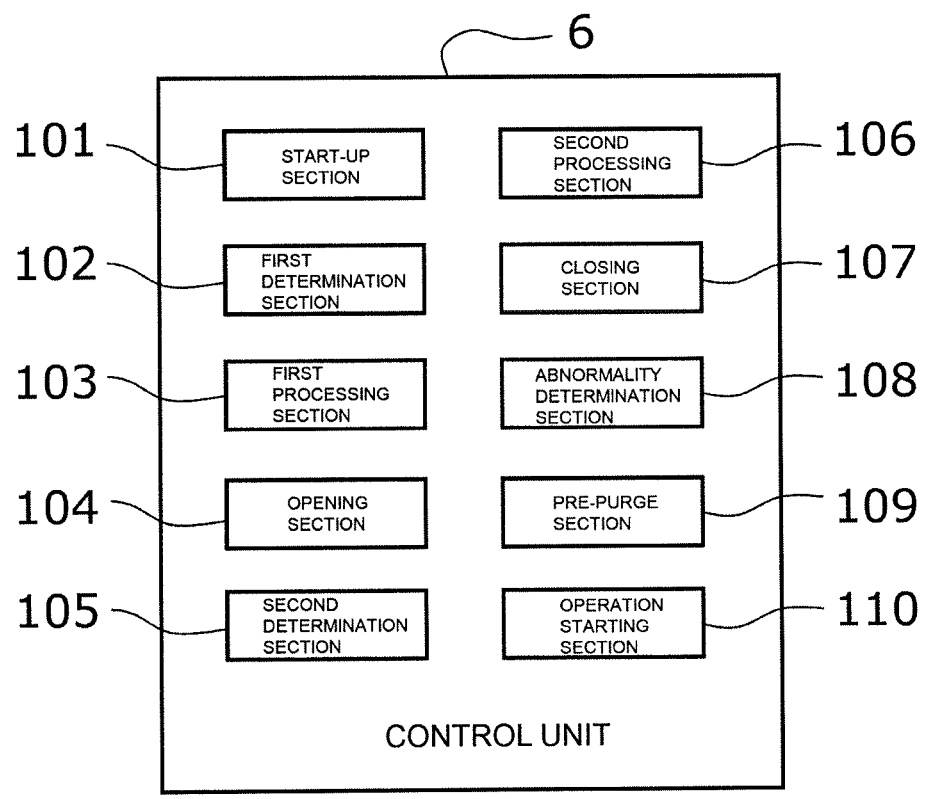
FIG. 2 is a view showing the configuration for performing start-up control and abnormality detection control.

FIG. 2 is a diagram showing the configuration for performing start-up control and abnormality detection control. The configuration is made up of hardware and software that constitute the control unit 6. The control unit 6 comprises: a start-up section 101, a first determination section 102, a first processing section 103, an opening section 104, a second determination section 105, a second processing section 106, a closing section 107, an abnormality determination section 108, a pre-purge section 109, and an operation start section 110.

Figure 3:
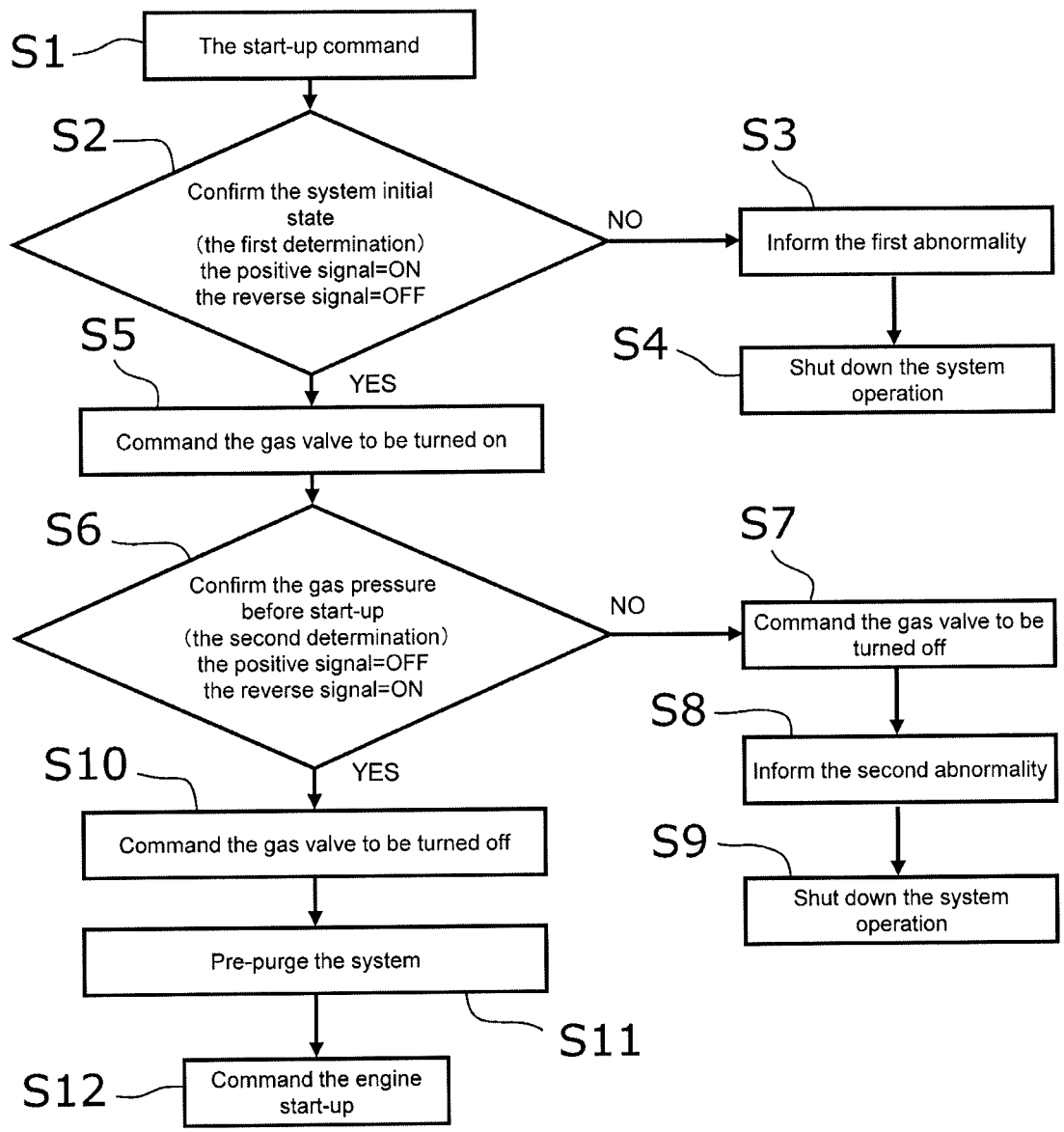
FIG. 3 is a flow chart showing a start-up method of the gas engine system.

FIG. 3 is a flow diagram showing start-up control of the system 1. The start-up control includes steps S1-S12. The start-up control includes abnormality detection control constituted by steps S1-S9.

Before the start-up control is started, the system 1 is shut down, and the gas valve 4 is closed. Therefore, the pressure in the gas pipe 3 is kept at a low pressure. In order to start up the system 1, the operator inputs a start-up command to the control unit 6 by operating the operating device 10. In step S1 on the basis of the inputted start-up command, the start-up section 101 starts start-up control.

Step S2 is performed next to step S1. In step S2, as a confirmation of an initial state of the system (first determination), the first determination section 102 determines whether or not the gas pressure is the low pressure on the basis of the pressure information, when the gas valve 4 is closed. Specifically, the first determination section 102 determines whether or not a combined signal of the positive signal=ON, and the reverse signal=OFF is obtained. Here, the positive signal=ON means a state in which a signal is inputted to the control unit 6 from the positive signal line 14a, and the reverse signal=OFF means a state in which the signal is not inputted to the control unit 6 from the reverse signal line 14b.

If no abnormality has occurred, and the gas pressure is lower than the set pressure, since the gas pressure switch 5 is in the conductive state, the combined signal of the positive signal=ON and the reverse signal=OFF is obtained.

On the other hand, if the combined signal of the positive signal=ON and the reverse signal=OFF is not obtained, it is considered that an abnormality has occurred. The abnormality determined in step S2 (the first determination) is referred to as a first abnormality. As a cause of the first abnormality, at least one of the causes (1a), (2a), (3), (4), and (5) is considered.

(1a) Closure failure of the gas pressure switch 5: A state in which the b-contact is always open and the b-contact cannot be closed (contact failure etc.)

(2a) Disconnection of the SW output line 12a, 12b

(3) Failure of the IF board 13

(4) Disconnection of the signal line 14a, 14b or a short circuit between the signal line 14a, 14b and the power supply (5) Closure failure of the gas valve 4

If the combined signal of the positive signal=ON, and the reverse signal=OFF is not obtained, the abnormality determination section 108 determines that an abnormality has occurred. If it is determined that the abnormality has occurred, steps S3, S4 are performed. By performing step S4, the start-up control is interrupted.

In step S3, the first processing section 103 controls the display device (alarm) 11 so as to inform the operator of the occurrence of the first abnormality. Specifically, for example, the first processing section 103 allows literal information "an abnormality has been found in confirmation of the initial state of the system" to be displayed on a display of the display device 11.

Step S4 is performed next to step S3. In step S4, the first processing section 103 interrupts the start-up control, and stops the operation of the system 1.

If the combined signal of the positive signal=ON, and the reverse signal=OFF is obtained in step S2, step S5 is performed. In step S5, the opening section 104 opens the gas valve 4. If no abnormality has occurred, the pressure in the gas pipe 3 is increased by opening the gas valve 4.

Step S6 is performed next to step S5. In step S6, as a confirmation of the gas pressure before start-up (second determination), the second determination section 105 determines whether or not the gas pressure is equal to or higher than a set pressure on the basis of the pressure information, when the gas valve 4 is open. Specifically, the second determination section 105 determines whether or not a combined signal of the positive signal=OFF, and the reverse signal=ON is obtained.

If no abnormality has occurred, and the gas pressure is equal to or higher than the set pressure, since the gas pressure switch 5 is in the non-conductive state, the combined signal of the positive signal=OFF and the reverse signal=ON is obtained.

On the other hand, if the combined signal of the positive signal=OFF and the reverse signal=ON is not obtained, it is considered that an abnormality has occurred. The abnormality determined in step S6 (the second determination) is referred to as a second abnormality. As a cause of the second abnormality, at least one of the causes (1b), (2b), (3), (4), (5), and (6) is considered.

(1b) Open failure of the gas pressure switch 5: A state in which the b-contact is always closed and the b-contact cannot be opened (contact welding etc.)

(2b) A short circuit between the SW output line 12a, 12b and the power supply (3) Failure of the IF board 13

(4) Disconnection of the signal line 14a, 14b or a short circuit between the signal line 14a, 14b and the power supply (5) Open failure of the gas valve 4

(6) A pressure reduction in a gas source

If the combined signal of the positive signal=OFF, and the reverse signal=ON is not obtained, the abnormality determination section 108 determines that an abnormality has occurred. If it is determined that the abnormality has occurred, steps S7-S9 are performed. By performing step S9, the start-up control is interrupted.

In step S7, the closing section 107 closes the gas valve 4.

In step S8, the second processing section 106 controls the display device (alarm) 11 so as to inform the operator of the occurrence of the second abnormality. Specifically, for example, the second processing section 106 allows literal information "an abnormality has been found in confirmation of the gas pressure before start-up" to be displayed on the display of the display device 11.

Step S9 is performed next to step S8. In step S9, the second processing section 106 interrupts the start-up control, and stops the operation of the system 1.

If the combined signal of the positive signal=OFF, and the reverse signal=ON is obtained in step S6, step S10 is performed. In step S10, the closing section 107 closes the gas valve 4.

Step S11 is performed next to step S10. In step S11, the pre-purge section 109 drives the fan 9 before the start of the operation of the gas engine 2 to ventilate the inside of the system 1.

Step S12 is performed next to step S11. Step S12 is performed if the combined signal of the positive signal=ON, and the reverse signal=OFF is obtained in step S2, and the combined signal of the positive signal=OFF, and the reverse signal=ON is obtained in step S6. That is, if it is considered that no abnormality has occurred, step S12 is performed. In step S12, the operation start section 110 starts the operation of the gas engine 2 by opening the gas valve 4 immediately after driving the starter motor 15.

With reference to FIGS. 4 to 7, the operation of the system 1 in the start-up control will be described. FIGS. 4 to 7 each show a time chart of the start-up control.

Figure 4:
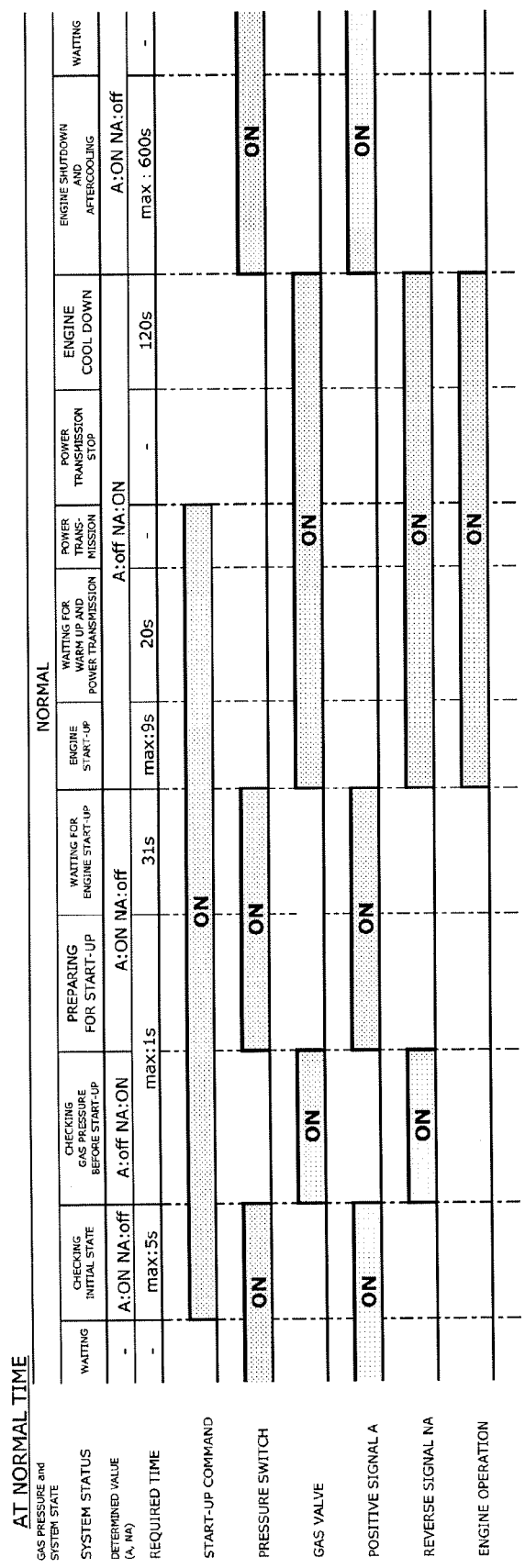
FIG. 4 is a view showing a time chart of the start-up control at a normal time.
Figure 5:
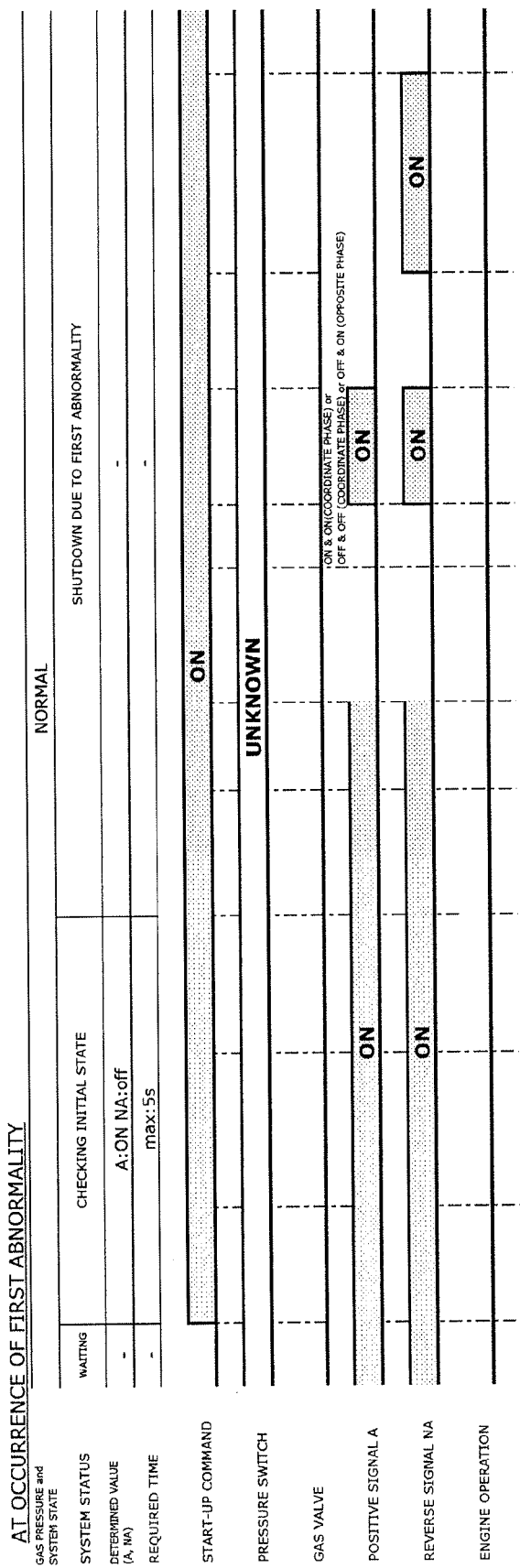
FIG. 5 is a view showing an example of the time chart of the start-up control at the occurrence of a first abnormality.
Figure 6:
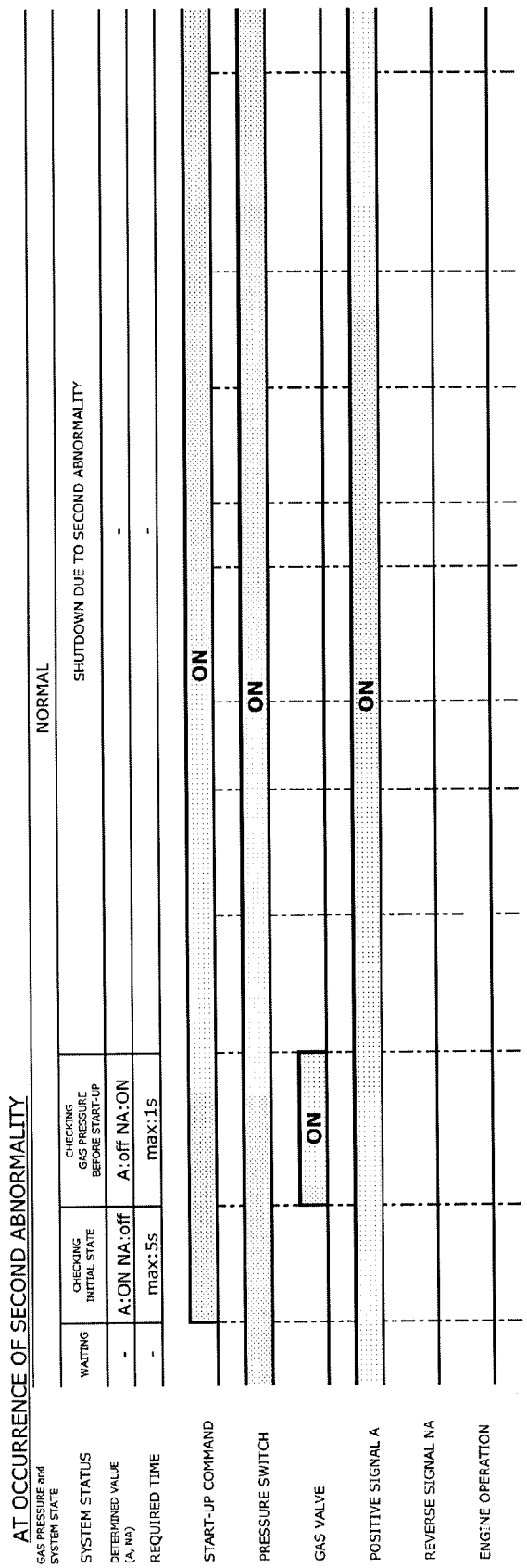
FIG. 6 is a view showing an example of the time chart of the start-up control at the occurrence of a second abnormality.
Figure 7:
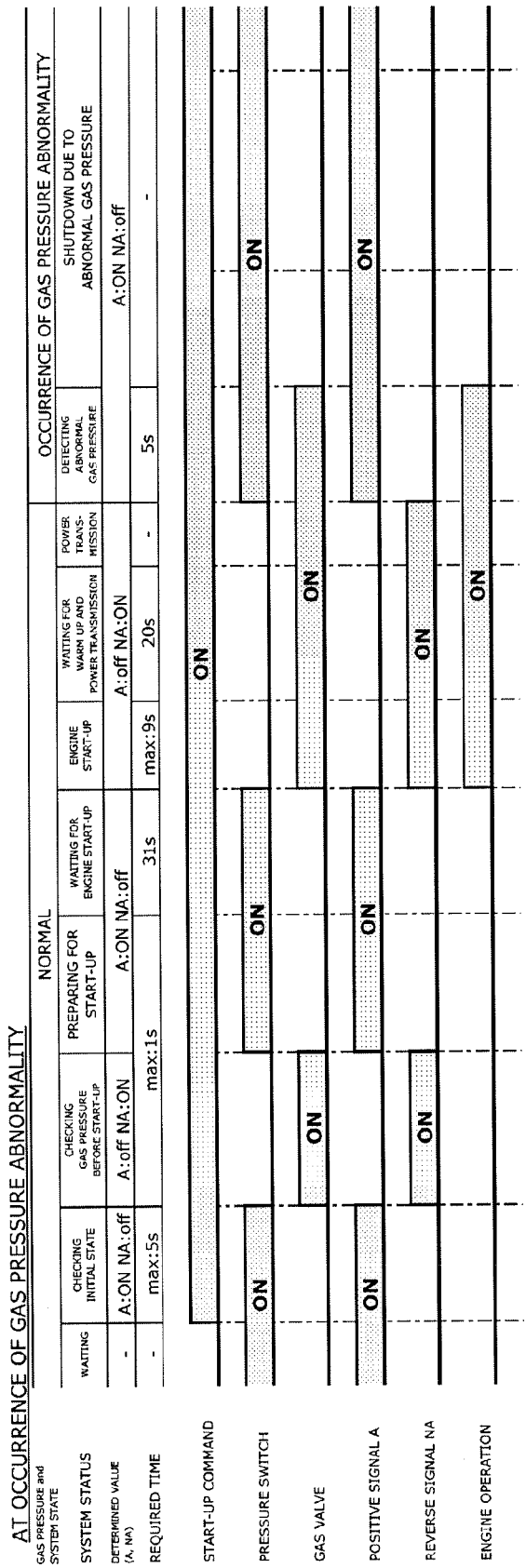
FIG. 7 is a view showing an example of the time chart of the start-up control at the occurrence of a gas pressure abnormality.

In FIGS. 4 to 9, the horizontal axis is a time axis. Along the horizontal axis, respective processing contents included in the start-up control are listed. In FIG. 4, a group of the processing contents includes "WAITING", "CHECKING INITIAL STATE", "CHECKING GAS PRESSURE BEFORE START-UP", "PREPARING FOR START-UP", "WAITING FOR ENGINE START-UP", "ENGINE START-UP", "WAITING FOR WARM UP AND POWER TRANSMISSION", "POWER TRANSMISSION", "POWER TRANSMISSION STOP", "ENGINE COOL DOWN", and "ENGINE SHUTDOWN AND AFTERCOOLING". In FIG. 5, the group of the processing contents further includes "SHUTDOWN DUE TO FIRST ABNORMALITY". In FIG. 6, the group of the processing contents further includes "SHUTDOWN DUE TO SECOND ABNORMALITY". In FIG. 7, the group of the processing contents further includes "DETECTING ABNORMAL GAS PRESSURE" and "SHUTDOWN DUE TO ABNORMAL GAS PRESSURE".

The processing contents shown in FIGS. 4 to 7 include the steps shown in FIG. 3. "CHECKING INITIAL STATE" includes step S2. "CHECKING GAS PRESSURE BEFORE START-UP" includes steps S5, S6. "PREPARING FOR START-UP" includes step S10. "WAITING FOR ENGINE START-UP" includes step S11. "ENGINE START-UP" includes step S12. "SHUTDOWN DUE TO FIRST ABNORMALITY" includes steps S3, S4. "SHUTDOWN DUE TO SECOND ABNORMALITY" includes steps S7-S9.

In FIGS. 4-7, along the vertical axis, operation states of the respective elements included in the system 1 are listed. A group of the elements includes "START-UP COMMAND", "PRESSURE SWITCH", "GAS VALVE", "POSITIVE SIGNAL A", "REVERSE SIGNAL NA", and "ENGINE OPERATION". The operation state of each element is either an ON state or an OFF state.

The operation state of "START-UP COMMAND" is determined on the basis of generation or disappearance of the start-up command inputted to the control unit 6 by the operating device 10. When the start-up command is inputted to the control unit 6, "START-UP COMMAND" is in the ON state, and when the start-up command is not inputted to the control unit 6, "START-UP COMMAND" is in the OFF state.

Since the pressure information obtained by the gas pressure switch 5 is not directly transmitted to the control unit 6, the control unit 6 cannot directly detect the operation state of "PRESSURE SWITCH". Therefore, the operation state of "PRESSURE SWITCH" is estimated on the basis of the operation states of "POSITIVE SIGNAL A" and "REVERSE SIGNAL NA".

The operation state of "GAS VALVE" is determined on the basis of generation of an opening command and a closing command. The control unit 6 generates the opening command for opening the gas valve 4 and the closing command for closing the gas valve 4. Therefore, the control unit 6 can recognize the generation of the opening command and the closing command. When the opening command is generated, "GAS VALVE" is in the ON state, and when the closing command is generated, "GAS VALVE" is in the OFF state.

The operation state of "POSITIVE SIGNAL A" is determined by reflecting the state of the gas pressure switch 5. When the gas pressure switch 5 is closed, which becomes the conductive state, and a signal is inputted to the IF board 13, "POSITIVE SIGNAL A" is in the ON state. When the gas pressure switch 5 is open, which becomes the non-conductive state, and the signal is not inputted to the IF board 13, "POSITIVE SIGNAL A" is in the OFF state. On the other hand, the operation state of "REVERSE SIGNAL NA" is determined by inverting the state of the gas pressure switch 5. Opposite to the operation state of "POSITIVE SIGNAL A", when the gas pressure switch 5 is closed, which is in the conductive state, the signal is not inputted to the IF board 13, and "REVERSE SIGNAL NA" is in the OFF state. When the gas pressure switch 5 is open, which is in the non-conductive state, the signal is inputted to the IF board 13, and "REVERSE SIGNAL NA" becomes the ON state.

The operation state of "ENGINE OPERATION" is determined on the basis of rotation and stop of the output shaft 21 of the gas engine 2. The control unit 6 can recognize the rotation and stop of the output shaft 21 on the basis of detection information obtained by a sensor 22 for detecting a rotation number of the output shaft 21.

FIG. 4 is the diagram showing the time chart of the start-up control at a normal time. The normal time shows a state in which no abnormality has occurred in the system 1. At the normal time, "POSITIVE SIGNAL A" synchronizes with the operation state of "PRESSURE SWITCH", and "REVERSE SIGNAL NA" synchronizes with the operation state of "GAS VALVE".

In "WAITING", "START-UP COMMAND" is in the OFF state, and the gas valve is in the OFF state. Further, in the normal state, "POSITIVE SIGNAL A" is in the ON state, and "REVERSE SIGNAL NA" is in the OFF state. If "START-UP COMMAND" becomes the ON state, "CHECKING INITIAL STATE" including step S2 is performed.

In "CHECKING INITIAL STATE" (step S2), since the combined signal of the positive signal=ON, and the reverse signal=OFF is obtained, "CHECKING GAS PRESSURE BEFORE START-UP" including steps S5, S6 is performed. In "CHECKING GAS PRESSURE BEFORE START-UP", "GAS VALVE" is switched from the OFF state to the ON state. As a result, the gas valve 4 is opened, and the pressure in the gas pipe 3 becomes to be equal to or higher than the set pressure. As a result, "POSITIVE SIGNAL A" is switched from the ON state to the OFF state, and "REVERSE SIGNAL NA" is switched from the OFF state to the ON state.

Further, in "CHECKING GAS PRESSURE BEFORE START-UP" (step S6), since the combined signal of the positive signal=OFF, and the reverse signal=ON is obtained, "PREPARING FOR START-UP" including step S10 is performed. In "PREPARING FOR START-UP", "GAS VALVE" is switched from the ON state to the OFF state. As a result, the gas valve is closed, and the pressure in the gas pipe 3 becomes lower than the set pressure. As a result, "POSITIVE SIGNAL A" is switched from the OFF state to the ON state, and "REVERSE SIGNAL NA" is switched from the ON state to the OFF state.

Next to "PREPARING FOR START-UP", "WAITING FOR ENGINE START-UP" including step S11 is performed. In "WAITING FOR ENGINE START-UP", pre-purge is performed by driving the fan 9. As a result, the inside of the system 1 is ventilated. In "PREPARING FOR START-UP" and "WAITING FOR ENGINE START-UP", "GAS VALVE" is in the OFF state, "POSITIVE SIGNAL A" is in the ON state, and "REVERSE SIGNAL NA" is in the OFF state. Next to "WAITING FOR ENGINE START-UP", "ENGINE START-UP" including step S12 is performed. In "ENGINE START-UP", the gas valve is switched from the OFF state to the ON state. As a result, the gas valve 4 is opened and the pressure in the gas pipe 3 becomes to be equal to or higher than the set pressure. As a result, "POSITIVE SIGNAL A" is switched from the ON state to the OFF state, and "REVERSE SIGNAL NA" is switched from the OFF state to the ON state. Further, in "ENGINE START-UP", since the starter motor 15 is rotated, "ENGINE OPERATION" is switched from the OFF state to the ON state.

Following "ENGINE START-UP", "WAITING FOR WARM UP AND POWER TRANSMISSION" and "POWER TRANSMISSION" are performed in order. "WAITING FOR WARM UP AND POWER TRANSMISSION" is in a state of waiting for a circuit breaker (not shown) to close the circuit. In "POWER TRANSMISSION", electric power generated by the generator 8 by closing the circuit breaker is supplied to the outside of the system 1. In "POWER TRANSMISSION STOP", power supply to the outside is stopped by opening the circuit breaker. If "START-UP COMMAND" becomes the OFF state, "POWER TRANSMISSION STOP" and "ENGINE COOL DOWN" are performed in order. In "ENGINE START-UP", "WAITING FOR WARM UP AND POWER TRANSMISSION", "POWER TRANSMISSION", "POWER TRANSMISSION STOP", and "ENGINE COOL DOWN", "GAS VALVE" is in the ON state, "POSITIVE SIGNAL A" is in the OFF state, and "REVERSE SIGNAL NA" is in the ON state.

Next to "ENGINE COOL DOWN", "ENGINE SHUTDOWN AND AFTERCOOLING" is performed. In "ENGINE SHUTDOWN AND AFTERCOOLING", "GAS VALVE" is switched from the ON state to the OFF state. Since the gas valve 4 is closed, "POSITIVE SIGNAL A" is switched from the OFF state to the ON state, and "REVERSE SIGNAL NA" is switched from the ON state to the OFF state. Therefore, in "ENGINE SHUTDOWN AND AFTERCOOLING", supply of the fuel gas is stopped, and the gas engine 2 is shut down.

Next to "ENGINE SHUTDOWN AND AFTERCOOLING", the system 1 becomes "WAITING" again.

FIGS. 5 to 7 each show a time chart of the start-up control at the occurrence of an abnormality.

FIG. 5 is a diagram showing an example of the time chart of the start-up control at the occurrence of a first abnormality. At the occurrence of the first abnormality, in "CHECKING INITIAL STATE" including step S2, the occurrence of the abnormality is detected.

In "WAITING", "START-UP COMMAND" is in the OFF state, "GAS VALVE" is in the OFF state. Further, "POSITIVE SIGNAL A" and "REVERSE SIGNAL NA" are both in the ON state. In such a state, when "START-UP COMMAND" becomes the ON state, "CHECKING INITIAL STATE" including step S2 is performed.

Since the combined signal of the positive signal=ON, and the reverse signal=OFF is not obtained in "CHECKING INITIAL STATE" (step S2), "SHUTDOWN DUE TO FIRST ABNORMALITY" including steps S3, S4 is performed. In "SHUTDOWN DUE TO FIRST ABNORMALITY", the occurrence of the first abnormality is informed and the operation of the system 1 is shut down.

At the occurrence of the first abnormality, "POSITIVE SIGNAL A" and "REVERSE SIGNAL NA" can take three patterns. A first pattern is that "POSITIVE SIGNAL A" and "REVERSE SIGNAL NA" are both in the ON state. A second pattern is that "POSITIVE SIGNAL A" and "REVERSE SIGNAL NA" are both in the OFF state. A third pattern is that "POSITIVE SIGNAL A" is in the OFF state, and "REVERSE SIGNAL NA" is in the ON state. The followings are highly probable: Failure of the IF board 13 or a short circuit between the reverse signal line 14b and the power supply has occurred in the first pattern. Failure of the IF board or disconnection of the positive signal line 14a has occurred in the second pattern. Closure failure of the gas pressure switch 5, disconnection of the SW output line 12a, 12b, or closure failure of the gas valve 4 has occurred in the third pattern. The example shown in FIG. 5 shows the first pattern at the occurrence of the first abnormality.

FIG. 6 is a diagram showing an example of the time chart of the start-up control at the occurrence of a second abnormality. At the occurrence of the second abnormality, in "CHECKING GAS PRESSURE BEFORE START-UP" including step S6, the occurrence of the abnormality is detected.

Operation states of the respective elements at the occurrence of the second abnormality (FIG. 6) are equal to the operation states of the respective elements at the normal time (FIG. 4).

In "CHECKING GAS PRESSURE BEFORE START-UP", "GAS VALVE" is switched from the OFF state to the ON state. When no abnormality occurs, "POSITIVE SIGNAL A" is switched from the ON state to the OFF state, and "REVERSE SIGNAL NA" is switched from the OFF state to the ON state. However, in FIG. 6, switchover between the states hasn't occurred in FIG. 6, so that "POSITIVE SIGNAL A" is in the ON state, and "REVERSE SIGNAL NA" is in the OFF state.

As a result, in "CHECKING GAS PRESSURE BEFORE START-UP", the combined signal of the positive signal=OFF, and the reverse signal=ON is not obtained. Therefore, "SHUTDOWN DUE TO SECOND ABNORMALITY" including steps S7-S9 is performed. In "SHUTDOWN DUE TO SECOND ABNORMALITY", the closing command for the gas valve 4 is generated, the occurrence of the second abnormality is informed, and the operation of the system 1 is shut down.

At the occurrence of the second abnormality, "POSITIVE SIGNAL A" and "REVERSE SIGNAL NA" can take three patterns. A first pattern is that "POSITIVE SIGNAL A" and "REVERSE SIGNAL NA" are both in the ON state. A second pattern is that "POSITIVE SIGNAL A" and "REVERSE SIGNAL NA" are both in the OFF state. A third pattern is that "POSITIVE SIGNAL A" is in the ON state, and "REVERSE SIGNAL NA" is in the OFF state. The followings are highly probable: Failure of the IF board 13 or a short circuit between the positive signal line 14a and the power supply has occurred in the first pattern. Failure of the IF board or disconnection of the reverse signal line 14b has occurred in the second pattern. Open failure of the gas pressure switch 5, a short circuit between the SW output line 12a, 12b and the power supply, open failure of the gas valve 4 or a gas pressure reduction has occurred in the third pattern. The example shown in FIG. 6 shows the third pattern at the occurrence of the second abnormality.

FIG. 7 shows a state in which the gas pressure is reduced less than the set pressure during the operation of the gas engine 2. During the operation of the gas engine 2, namely if the operation state of "ENGINE OPERATION" is in the ON state, "ENGINE START-UP", "WAITING FOR WARM UP AND POWER TRANSMISSION", "POWER TRANSMISSION", "POWER TRANSMISSION STOP", and "ENGINE COOL DOWN" are being performed.

During the operation of the gas engine 2, the control unit 6 is always monitoring the operation states of "POSITIVE SIGNAL A" and "REVERSE SIGNAL NA". When it becomes impossible to obtain the combined signal of the positive signal=OFF, and the reverse signal=ON during the operation, "DETECTING ABNORMAL GAS PRESSURE" is performed. If the performance time of "DETECTING ABNORMAL GAS PRESSURE" is continued for a certain period of time, the control unit 6 determines that a gas pressure abnormality has occurred. If the occurrence of the gas pressure abnormality is detected, "SHUTDOWN DUE TO ABNORMAL GAS PRESSURE" is performed. In "SHUTDOWN DUE TO ABNORMAL GAS PRESSURE", the closing command for the gas valve 4 is generated, the occurrence of the gas pressure abnormality is informed, and the operation of the system 1 is shut down.

When an abnormality occurs due to a cause other than the gas pressure, it is determined that the gas pressure switch 5 and the transfer mechanism 7 for the pressure information are normal in "CHECKING INITIAL STATE" and "CHECKING GAS PRESSURE BEFORE START-UP". Therefore, it is highly probable that, if the occurrence of an abnormality is detected at the occurrence of abnormality, the cause of the abnormality is due to a gas pressure reduction per se.

The effects of the gas engine system 1 of the present embodiment will be described.

In the present embodiment, the control unit 6 includes the first determination section 102 for performing the first determination, the opening section 104, the second determination section 105 for performing the second determination, the closing section 107, and the abnormality determination section 108. Therefore, the present embodiment can determine whether or not the pressure information actually transmitted from the gas pressure switch 5 to the control unit 6 corresponds to the gas pressure estimated by opening and closing of the gas valve 4, and can determine whether or not the abnormality has occurred, on the basis of the determination result.

In the present embodiment, the control unit 6 further includes the operation start section 110. Therefore, it is possible to prevent the operation of the gas engine 2 from starting when the abnormality occurs in the gas pressure detection mechanism such as the transfer mechanism 7 for the pressure information or the pressure switch 5.

In the present embodiment, as the pressure sensor for outputting the pressure information corresponding to the gas pressure, the pressure switch 5 having the b-contact is used.

Therefore, in the present embodiment, if it is determined that the pressure switch 5 is in the non-conductive state before opening the gas valve 4, it is possible to detect failure of the pressure switch 5 or the transfer mechanism 7 for the pressure information.

The present embodiment further includes the IF board 13 so that the combined signal of the positive signal reflecting the contact state of the pressure switch 5 and the reverse signal obtained by inverting the contact state of the gas pressure switch 5 is generated. Therefore, the present embodiment makes it possible to obtain an output signal in spite of using the pressure switch 5 having the b-contact even if the pressure switch 5 is in the non-conductive state.

In the present embodiment, the following modified configurations can be adopted.

In the present embodiment, the pressure sensor outputting the pressure information that corresponds to the gas pressure is the pressure switch having the b-contact. In another embodiment, in place of the pressure switch outputting, as information, only a comparison result between the gas pressure and the set value, the system 1 may include a pressure sensor outputting a pressure signal including information that corresponds to the magnitude of the gas pressure.

In another embodiment, in place of the pressure switch having the b-contact, the system 1 may include a pressure switch having a a-contact. In this embodiment, it is possible to obtain pressure information directly corresponding to the high pressure and the low pressure of the gas pressure.

In the present embodiment, the transfer mechanism for transmitting the pressure information from the pressure sensor to the control device includes the SW output lines 12a and 12b, the IF board 13, and the positive signal line 14a and the reverse signal line 14b. The IF board 13, and the positive signal line 14a and the reverse signal line 14b are provided in order to invert the signals. Therefore, in another embodiment, the transfer mechanism may also only include the SW output lines 12a and 12b. In this case, the SW output lines 12a and 12b each connect the pressure sensor and the control device.

DESCRIPTION OF NUMERALS 1 gas engine system
2 gas engine
3 gas pipe (gas passage)
4 gas valve
5 gas pressure switch (pressure sensor)
6 control unit (control device)
7 transfer mechanism
10 operating device (input device)
13 IF board (logic circuit)

The invention claimed is:

1. A gas engine system comprising:
a gas engine;
a gas passage for supplying a fuel gas to the gas engine;
a gas valve for opening and closing the gas passage;
a control device for recognizing opening and closing of the gas valve, and controlling the gas valve;
a pressure sensor for outputting pressure information corresponding to a gas pressure in the gas passage on a downstream side of the gas valve; and
a transfer mechanism for transmitting the pressure information from the pressure sensor to the control device, wherein
the control device comprises:
a first determination section for determining, as a first determination, whether or not the gas pressure is a low pressure of less than a predetermined pressure on the basis of the pressure information, while the control device recognizes that the gas valve is closed;

an opening section for opening the gas valve if it is determined that the gas pressure is the low pressure in the first determination;

a second determination section for determining, as a second determination, whether or not the gas pressure is a high pressure of equal to or more than the predetermined pressure on the basis of the pressure information, while the control device recognizes that the gas valve is open, if it is determined that the gas pressure is the low pressure in the first determination;

a closing section for closing the gas valve after the second determination is performed; and an abnormality determination section for determining that an abnormality has occurred, if it is determined that the gas pressure is the high pressure in the first determination, or if it is determined that the gas pressure is the low pressure in the second determination.

2. The gas engine system according to claim 1, comprising an input device for inputting a start-up command, wherein the control device controls the gas engine, and further comprises:

a start-up section for performing the first determination and the second determination before start of operation of the gas engine when receiving the start-up command; and an operation start section for opening the gas valve and starting the operation of the gas engine, if it is determined that the gas pressure is the low pressure in the first determination, and if it is determined that the gas pressure is the high pressure in the second determination.

3. The gas engine system according to claim 2, wherein the pressure sensor is a pressure switch having a b-contact, which becomes a conductive state when the gas pressure is the low pressure, and which becomes a non-conductive state when the gas pressure is the high pressure.

4. The gas engine system according to claim 2, wherein the pressure sensor is a pressure switch having a a-contact, which becomes a conductive state when the gas pressure is the high pressure, and which becomes a non-conductive state when the gas pressure is the low pressure.

5. The gas engine system according to claim 3, wherein the transfer mechanism for the pressure information further comprises a logic circuit for generating a combined signal of a positive signal that reflects a conductive or non-conductive state of the pressure switch and a reverse signal that inverts the conductive or non-conductive state of the pressure switch.

* * * * *